(12) United States Patent
Aso et al.

(10) Patent No.: US 9,752,805 B2
(45) Date of Patent: Sep. 5, 2017

(54) ADSORPTION HEAT PUMP

(71) Applicant: FUJITSU LIMITED, Kawasaki-shi, Kanagawa (JP)

(72) Inventors: Noriyasu Aso, Isehara (JP); Toshio Manabe, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 792 days.

(21) Appl. No.: 13/755,455

(22) Filed: Jan. 31, 2013

(65) Prior Publication Data
US 2013/0139538 A1 Jun. 6, 2013

Related U.S. Application Data

(63) Continuation of application No. PCT/JP2010/063318, filed on Aug. 5, 2010.

(51) Int. Cl.
| | |
|---|---|
| F25B 17/08 | (2006.01) |
| F25B 35/04 | (2006.01) |
| F28D 1/053 | (2006.01) |
| F28D 21/00 | (2006.01) |

(52) U.S. Cl.
CPC ............. *F25B 17/08* (2013.01); *F25B 35/04* (2013.01); *F28D 1/05366* (2013.01); *F28D 21/0015* (2013.01); *F28F 2255/04* (2013.01); *Y02B 30/64* (2013.01)

(58) Field of Classification Search
CPC ....... B01D 53/06; B01D 53/047; F25B 15/16; F25B 17/083; F25B 39/026; F28D 21/0014; F25D 1/02
USPC .................. 62/439; 137/79; 138/28; 165/96
See application file for complete search history.

(56) References Cited

U.S. PATENT DOCUMENTS

| | | | |
|---|---|---|---|
| 3,519,067 A * | 7/1970 | Schmidt ................ | F28D 15/046 165/104.26 |
| 4,793,143 A * | 12/1988 | Rhodes .................. | B01D 53/26 62/93 |
| 5,217,063 A * | 6/1993 | Scaringe ................. | F28D 15/06 165/104.27 |

(Continued)

FOREIGN PATENT DOCUMENTS

| CN | 101482341 A | 7/2009 |
|---|---|---|
| JP | H4-225762 | 8/1992 |

(Continued)

OTHER PUBLICATIONS

Office Action of China Application 201080068404.4 dated Apr. 13, 2015. Full Translation of the Office Action.

(Continued)

*Primary Examiner* — Pascal M Bui Pho
*Assistant Examiner* — Marcos O Diaz
(74) *Attorney, Agent, or Firm* — Kratz, Quintos & Hanson, LLP

(57) ABSTRACT

An adsorption heat pump includes: an evaporator configured to evaporate a refrigerant; and an adsorbent heat exchanger provided with an adsorption member configured to adsorb vapor evaporated by the evaporator, and a heat transfer tube in which a heating medium flows. Here, the adsorbent heat exchanger includes a pressing mechanism configured to press and compress the adsorption member depending on a temperature of the heating medium flowing inside the heat transfer tube.

7 Claims, 6 Drawing Sheets

(56) References Cited

U.S. PATENT DOCUMENTS

| | | | |
|---|---|---|---|
| 5,308,703 A * | 5/1994 | Tsujimoto | B01J 20/28033 |
| | | | 428/186 |
| 5,732,569 A * | 3/1998 | Sanada | F25B 17/083 |
| | | | 62/148 |
| 6,041,617 A | 3/2000 | Sanada | |
| 6,460,612 B1 * | 10/2002 | Sehmbey | F28D 15/046 |
| | | | 165/104.26 |
| 2006/0005787 A1 * | 1/2006 | Sun | F22B 37/205 |
| | | | 122/510 |
| 2007/0204979 A1 * | 9/2007 | Matsushita | B01D 53/261 |
| | | | 165/151 |
| 2008/0099191 A1 * | 5/2008 | Taras | F25B 39/028 |
| | | | 165/174 |
| 2009/0288814 A1 * | 11/2009 | Stoia | F28D 9/0062 |
| | | | 165/185 |

FOREIGN PATENT DOCUMENTS

| | | |
|---|---|---|
| JP | H7-151418 | 6/1995 |
| JP | 2000-35256 | 2/2000 |
| JP | 2001-82697 A1 | 3/2001 |
| JP | 2003-114067 A1 | 4/2003 |

OTHER PUBLICATIONS

Office Action dated Jul. 29, 2014 corresponding to Chinese Patent Application No. 201080068404.4 with English translation.
International Search Report for International Application No. PCT/JP2010/063318 dated Sep. 7, 2010.

* cited by examiner

ADSORPTION HEAT PUMP

CROSS-REFERENCE TO RELATED APPLICATION

This application is a continuation of International Patent Application No. PCT/JP2010/063318 filed Aug. 5, 2010 and designated the U.S., the entire contents of which are incorporated herein by reference.

FIELD

The embodiments discussed herein relate to an adsorption heat pump.

BACKGROUND

In recent years, a large amount of data have been handled by computers along with the advent of advanced information society, and many computers have been installed and collectively managed in a single room in many cases. For example, in a data center, many racks (server racks) are installed in a computer room and each rack houses a plurality of computers (servers). Then, jobs are organically distributed to the computers and a large amount of jobs are efficiently processed.

In a data center, a large amount of heat (waste heat) is generated along with operation of computers. Conventionally, the heat is emitted to the atmosphere. However, in view of energy conservation and environmental loading reduction, a proposal has been made to recover and reuse the heat. Accordingly, attention has been focused on an adsorption heat pump as an apparatus which recovers and reuses heat at a relatively low temperature.

An adsorption heat pump includes, for example, an evaporator, two adsorbent heat exchangers, and a condenser. In the adsorption heat pump, the temperature of water flowing through a tube in the evaporator is reduced by utilizing an action of a refrigerant such as water or methanol which removes heat from the surroundings when being turned into vapor. The refrigerant vaporized in this process is adsorbed to an adsorbent placed in each of the adsorbent heat exchangers.

While one of the adsorbent heat exchangers is used for adsorption of the refrigerant, the other adsorbent heat exchanger performs recovery (drying) of the adsorbent. In the adsorbent heat exchanger on the recovery side, the adsorbent is heated by feeding hot water with a temperature increased by waste heat into the adsorbent heat exchanger, and thereby the refrigerant is evaporated. The vapor of the refrigerant desorbed from the adsorbent is cooled and returned into liquid by the condenser, and then the refrigerant is transferred to the evaporator.

In the adsorption heat pump, the adsorbent heat exchanger used for adsorption of the refrigerant and the adsorbent heat exchanger used for recovery of the adsorbent are switched at regular intervals.

Patent Document 1: Japanese Laid-open Patent Publication No. 2000-35256

Patent Document 2: Japanese Laid-open Patent Publication No. 2003-114067

For the purpose of further promoting energy conservation and environmental loading reduction, additional improvement in thermal efficiency of an adsorption heat pump is desired.

SUMMARY

According to an aspect of the embodiments, an adsorption heat pump includes: an evaporator configured to evaporate a refrigerant; and an adsorbent heat exchanger provided with an adsorption member configured to adsorb vapor evaporated by the evaporator, and a heat transfer tube in which a heating medium flows. Here, the adsorbent heat exchanger includes a pressing mechanism configured to press and compress the adsorption member depending on a temperature of the heating medium flowing inside the heat transfer tube.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Prior to descriptions of embodiments, a prelude is described below in order to facilitate the understanding of the embodiments.

For the purpose of improving thermal efficiency in an adsorption heat pump, it is important that an adsorption rate be increased when a vapor of a refrigerant is adsorbed to adsorbents (in adsorption), and that heat of hot water be quickly transferred to all the adsorbents when the adsorbents are dried (in recovery). For the purpose of increasing the adsorption rate of the refrigerant, it is important that the vapor of the refrigerant smoothly flows through a gap between the adsorbents, and thus it is preferable that the gap between the adsorbents be larger. On the other hand, for the purpose of quickly transferring heat of hot water to all the adsorbents, it is important that a heat transfer rate between the adsorbents be increased, and thus it is preferable that the gap between the adsorbents be smaller.

In other words, when the adsorbents are filled densely, the heat transfer rate between the adsorbents in recovery increases but the adsorption rate in adsorbing the refrigerants decreases. In contrast, when the adsorbents are filled sparsely, the adsorption rate in adsorbing the refrigerants increases but the heat transfer rate between the adsorbents in recovery decreases. For this reason, it is difficult to increase both the adsorption rate in adsorbing the refrigerants and the heat transfer rate between the adsorbents in recovery by using a conventional adsorption heat pump.

First Embodiment

Figure 1:
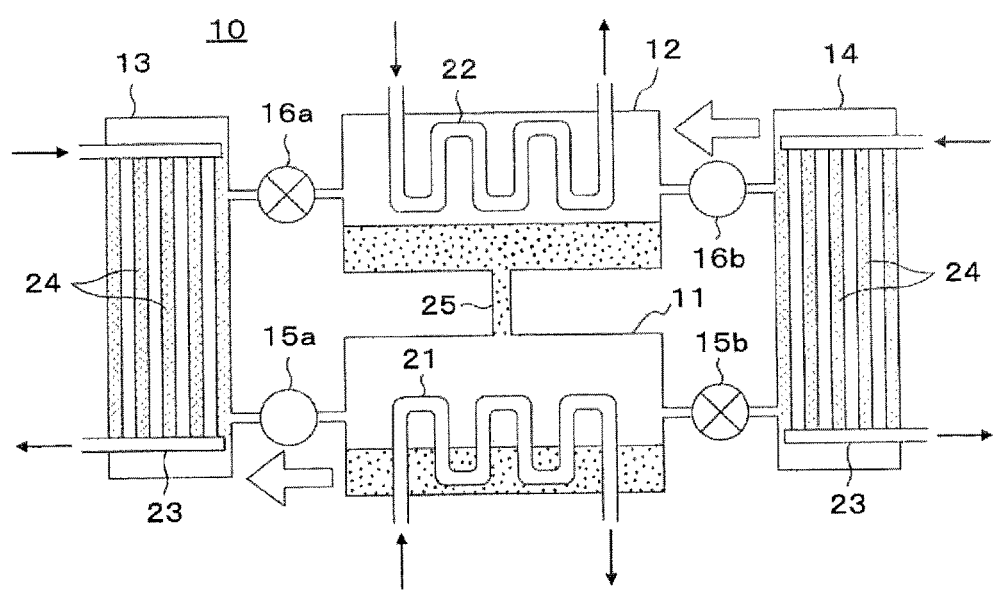
FIG. 1 is a schematic diagram of an adsorption heat pump according to a first embodiment.
Figure 2A:
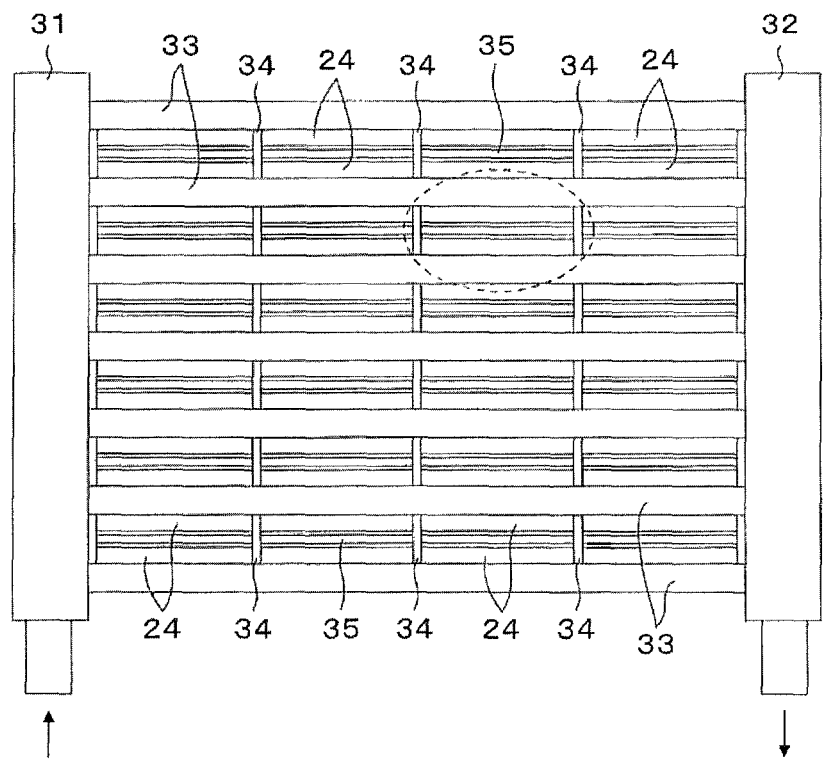
FIG. 2A is a plan view illustrating a structure inside an adsorbent heat exchanger in the adsorption heat pump according to the first embodiment.
Figure 2B:
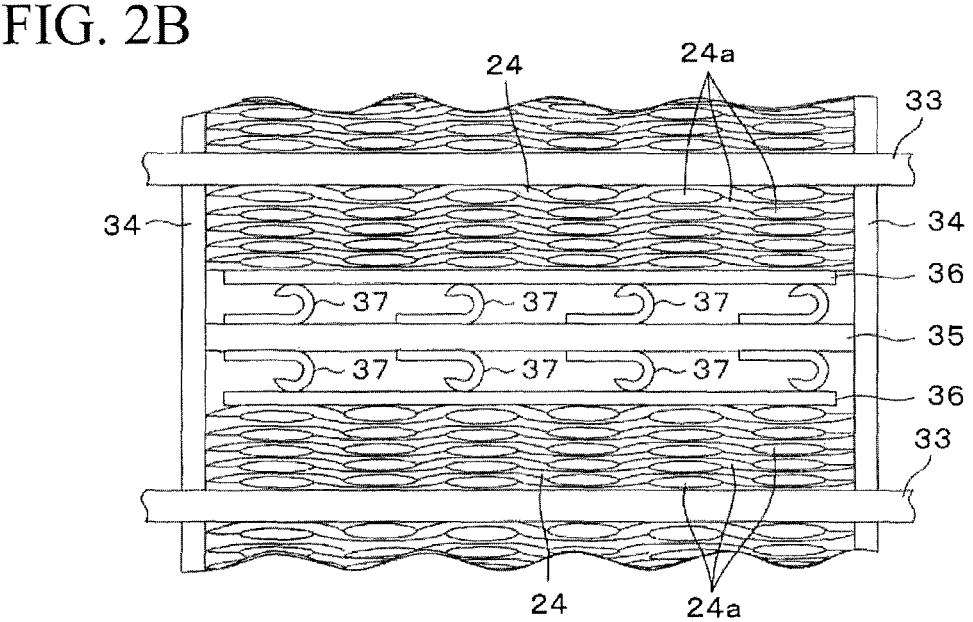
FIG. 2B is an enlarged view of a portion surrounded by a broken line in FIG. 2A.

FIG. 1 is a schematic diagram of an adsorption heat pump according to a first embodiment. In addition, FIG. 2A is a plan view illustrating a structure inside an adsorbent heat exchanger in the adsorption heat pump. FIG. 2B is an enlarged view of a portion surrounded by a broken line in FIG. 2A.

As illustrated in FIG. 1, an adsorption heat pump 10 of this embodiment includes an evaporator 11, a condenser 12, and adsorbent heat exchangers 13, 14. The evaporator 11 is connected to the adsorbent heat exchangers 13, 14 through valves 15a, 15b, respectively. The condenser 12 is connected to the adsorbent heat exchangers 13, 14 through valves 16a, 16b, respectively. Note that a space in the adsorption heat pump 10 is decompressed by a vacuum device (not illustrated).

In the evaporator 11, there are provided a cooling tube 21 and a spray nozzle (not illustrated) configured to spray a liquid refrigerant onto the cooling tube 21. Cooling water configured to cool a cooling target apparatus (for example, a server or the like) flows through the cooling tube 21.

In the condenser 12, there is provided a cooling tube 22. Cooling water is provided from an unillustrated water supply device to the cooling tube 22, and a gaseous refrigerant is condensed to a liquid as described later. The condenser 12 and the evaporator 11 are connected to each other by a tube 25, and the refrigerant liquefied by the condenser 12 is transferred to the evaporator 11 through the tube 25 and is sprayed from the spray nozzle.

In each of the adsorbent heat exchangers 13, 14, there are placed a heat transfer tube 23 and adsorption members 24. As illustrated in FIG. 2A, the heat transfer tube 23 includes an inlet manifold 31 into which a heating medium (cooling water or hot water) flows, an outlet manifold 32 out of which the heating medium flows, and a plurality of branched tubes 33 connected in parallel with one another between the inlet and outlet manifolds 31, 32.

Between the branched tubes 33, there are placed first heat transfer plates 34 each of which is placed perpendicular to the branched tubes 33 and which connects the branched tubes 33, and second heat transfer plates 35 each of which is placed parallel to the branched tubes 33 and which connects the first heat transfer plates 34. An area between the branched tubes 33 is divided into a plurality of rectangular spaces by the first and second heat transfer plates 34, 35. Each of the first and second heat transfer plates 34, 35 is formed of metal such as copper, a carbon plate or the like having good thermal conductivity, for example. For this reason, the temperature of the first and second heat transfer plates 34, 35 is substantially equal to the temperature of the heating medium flowing inside the branched tubes 33.

In each of the rectangular spaces partitioned by the first and second heat transfer plates 34, 35, there are placed the adsorption members 24 configured to adsorb the refrigerant, bimetals (thermosensitive members) 37 and pressing plates 36. Each of the bimetals 37 has a structure in which two types of metal plates with different thermal expansion coefficients are joined together, and formed of an alloy mainly including iron (Fe) and nickel (Ni), for example. The thermal expansion coefficients are adjusted by elements (for example, Mn, Cr, Cu, and the like) to be added into the alloy and the amounts of addition thereof, for example.

Each bimetal 37 is formed into a "J" shape. A straight-line portion on one end side of the bimetal 37 is fixed to the second heat transfer plate 35. A curved portion on the other end side (hereinafter also referred to as a tip end side) of the bimetal 37 is placed to be in contact with the pressing plate 36. In addition, each adsorption member 24 is placed between the corresponding pressing plate 36 and the corresponding branched tube 33.

A curvature radius of the curved portion on the tip end side of each bimetal 37 becomes larger when the temperature becomes higher than a predetermined temperature. Thereby, the bimetal 37 presses the pressing plate 36 toward the branched tube 33. In this way, the adsorption member 24 is sandwiched and compressed between the pressing plate 36 and the branched tube 33.

Note that in this embodiment, fibrous activated carbon (adsorbent) is processed into a sheet shape (fabric shape) to form an adsorbent sheet 24a, and a plurality of the adsorbent sheets 24a are superposed on one another and used as the adsorption member 24. Although the adsorption member 24 is not limited to the activated carbon processed into the sheet shape, the adsorption member 24 is preferred to be elastically deformable in response to the stress applied to the adsorption member 24 through the pressing plate 36.

Operations of the above-mentioned adsorption heat pump 10 are described below. Here, in the initial state, both the valve 15a between the evaporator 11 and the adsorbent heat exchanger 13, and the valve 16b between the adsorbent heat exchanger 14 and the condenser 12 are opened as illustrated in FIG. 1. In addition, both the valve 15b between the evaporator 11 and the adsorbent heat exchanger 14, and the valve 16a between the adsorbent heat exchanger 13 and the condenser 12 are closed.

Moreover, in this embodiment, water is used as a refrigerant. Further, the space in the adsorption heat pump 10 is decompressed by a vacuum device (not illustrated) to about 0.6 kPa to 6.0 kPa, for example. Furthermore, the curvature radius of the curved portion on the tip end side of each bimetal 37 becomes larger when the temperature exceeds 40° C., and thereby to apply a pressure to the adsorption member 24 through the pressing plate 36.

The cooling water used for cooling is supplied from the cooling target apparatus (for example, a server or the like) to the cooling tube 21 of the evaporator 11. In this embodiment, the temperature of the cooling water to be supplied to the evaporator 11 is about 20° C. to 25° C.

When the water is sprayed from the spray nozzle onto the cooling tube 21, latent heat is taken from the cooling tube 21. This is because the inside of the evaporator 11 is decompressed and the sprayed water is easily evaporated (gasified) on a peripheral surface of the cooling tube 21 or near the peripheral surface. In this way, the temperature of the cooling water flowing inside the cooling tube 21 is reduced, and the cooling water at a low temperature (for example, about 18° C.) is discharged from the cooling tube 21. The cooling water returns to the cooling target apparatus and is used to cool the cooling target apparatus.

Water vapor (the gaseous refrigerant) generated in the evaporator 11 enters the adsorbent heat exchanger 13 through the opened valve 15a, and is adsorbed to the adsorption member 24 in the adsorbent heat exchanger 13. When the water vapor is adsorbed to the adsorption member 24, the water vapor changes into water (liquid) and thus heat corresponding to vaporization heat is generated. This heat is transferred to the cooling water (heating medium) flowing inside the heat transfer tube 23, and consequently the temperature of the cooling water flowing inside the heat transfer tube 23 is increased. In this embodiment, the water at normal temperature (for example, 25° C.) is supplied as the cooling water to the heat transfer tube 23.

Figure 3A:
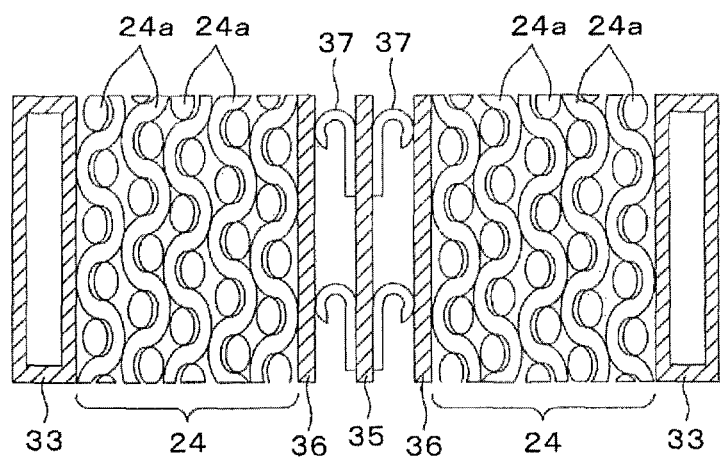
FIGS. 3A and 3B are schematic diagrams illustrating deformation of a bimetal due to the temperature of a heating medium flowing inside a heat transfer tube.

In this case, the temperature of the cooling water flowing inside the heat transfer tube 23 (branched tubes 33) is as low as about 25° C. Accordingly, as schematically illustrated in FIG. 3A, the curvature radius on the tip end side of each bimetal 37 becomes smaller. For this reason, the pressing force against the pressing plate 36 becomes smaller and the gap between the adsorbent sheets 24a expands due to elasticity of the adsorption members 24. In this way, the vapor of the refrigerant relatively easily enters the gap between the adsorbent sheets 24a, and thus the rate (adsorption rate) for the vapor of the refrigerant to be adsorbed to the adsorbent sheets 24a is increased.

While the adsorbent heat exchanger 13 executes an adsorption process of adsorbing the gaseous refrigerant generated from the evaporator 11, the other adsorbent heat exchanger 14 executes a recovery process of recovering (drying) the adsorption members 24. Specifically, the hot water (for example, hot water at about 70° C.) whose temperature is increased by the waste heat is supplied as the heating medium to the heat transfer tube 23 of the adsorbent heat exchanger 14. The adsorption members 24 are heated by this hot water, and moisture adsorbed to the adsorption members 24 is changed into gas (water vapor) to be desorbed from the adsorption members 24.

Figure 3B:
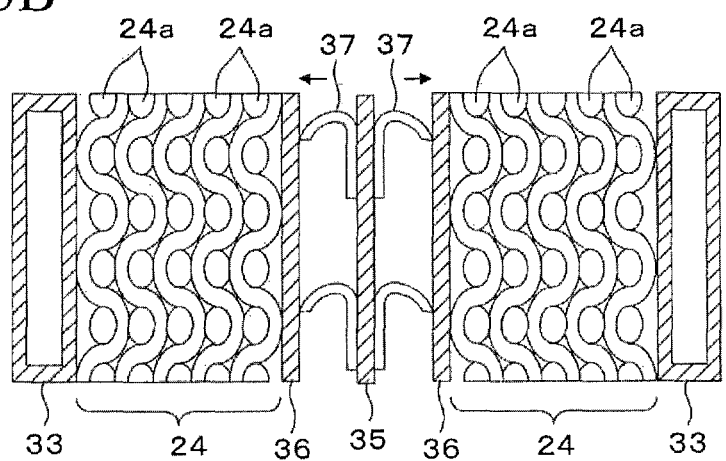

In this case, the temperature of the hot water flowing inside the heat transfer tube 23 (branched tubes 33) is as high as about 70° C. Accordingly, as schematically illustrated in FIG. 3B, the curvature radius on the tip end side of each bimetal 37 becomes larger. For this reason, the pressing force against the pressing plate 36 becomes larger and the adsorption member 24 is sandwiched and compressed between the pressing plate 36 and the branched tube 33. In this way, contact between the adsorbent sheets 24a becomes tight and the heat transfer rate between the adsorbent sheets 24a is increased, and thereby evaporation of the refrigerant (water) from the adsorbent sheets 24a is promoted. The vapor generated in the adsorbent heat exchanger 14 on the recovery side enters the condenser 12 through the valve 16b.

Cooling water at normal temperature is supplied to the cooling tube 22 in the condenser 12, for example. As for this cooling water, the cooling water discharged from the heat transfer tube 23 of the adsorbent heat exchanger 13 may be used. The water vapor entering the condenser 12 is condensed into water (liquid) on a peripheral surface of the cooling tube 22 or near the peripheral surface. Then, this water is transferred to the evaporator 11 through the tube 25, and sprayed from the spray nozzle onto the cooling tube 21.

The opened and closed state of each of the valves 15a, 15b, 16a, 16b is inverted in response to a signal outputted from a timer (not illustrated) at regular intervals, for example. At the same time, the hot water supplied in the adsorbent heat exchanger 14 is supplied to the heat transfer tube 23 of the adsorbent heat exchanger 13, and the cooling water supplied in the adsorbent heat exchanger 13 is supplied to the heat transfer tube 23 of the adsorbent heat exchanger 14. In this way, the adsorbent heat exchangers 13, 14 alternately perform the adsorption process and the recovery process at regular intervals.

As described above, the adsorption heat pump 10 according to this embodiment changes the pressure applied to the adsorption members 24 (adsorbent sheets 24a) by utilizing the action of each bimetal 37 which changes the shape depending on the temperature. In this way, the gap between the adsorbent sheets 24a becomes larger and the vapor of the refrigerant flows easily between the adsorbent sheets 24a at the time of adsorption of the refrigerant. In addition, the gap between the adsorbent sheets 24a becomes smaller at the time of recovery and the heat of the hot water flowing through the heat transfer tube 23 (branched tubes 33) is quickly transferred to the adsorbent sheets 24a.

As described above, according to this embodiment, it may be possible to increase both the adsorption rate at the time of adsorption of the refrigerant and the heat transfer rate between the adsorbent sheets 24a at the time of recovery. Consequently, a processing amount per unit time (a cooling amount of the cooling water flowing inside the cooling tube 21) is increased, and thus it may be possible to further improve thermal efficiency of the adsorption heat pump as compared to conventional ones.

Note that in the above embodiment, the pressure to be applied to the adsorbent sheets 24a is changed by the bimetals 37. However, the same effect may be achieved by using a member formed of a shape memory resin or a shape memory alloy (for example, KIOKALLOY (registered trademark) manufactured by Daido Steel Co., Ltd.), whose shape changes depending on the temperature, instead of the bimetals 37.

Meanwhile, although the activated carbon is used as the adsorbent in the above embodiment, silica gel or zeolite may be used as the adsorbent. Note that the activated carbon has an advantage in that adsorption and drying of moisture may be performed in a relatively low range of temperature and thus the activated carbon may be used even when the temperature of waste heat is low.

Example

A heat exchanger including a structure illustrated in FIGS. 2A and 2B is produced as a test heat exchanger 1. Here, a flat-plate type bimetal with a curvature coefficient (deformation ratio) of $14 \times 10^{-6}/°$ C., a force coefficient of 4750 kg/mm$^2$, and a length of 15 mm, which is processed into a "J" shape, is used as each bimetal 37. Meanwhile, a copper plate with thickness of 0.5 mm and purity of 99.99% is used as each pressing plate 36.

Moreover, KURACTIVE (registered trademark) manufactured by KURARAY CHEMICAL CO., LTD. is used as each adsorbent sheet 24a. Then, five adsorbent sheets 24a each with a width of 20 mm and a length of 60 mm are superposed on one another to form each adsorption member 24. The adsorption members 24 are placed on both sides of the second heat transfer plate 35. Note that a gap between the branched tubes 33 is 12 mm.

On the other hand, a heat exchanger including the same structure as the test heat exchanger 1 except for placing a copper plate with the same shape as that of the bimetal 37 instead of the bimetal 37 is produced as a test heat exchanger 2.

Figure 4:
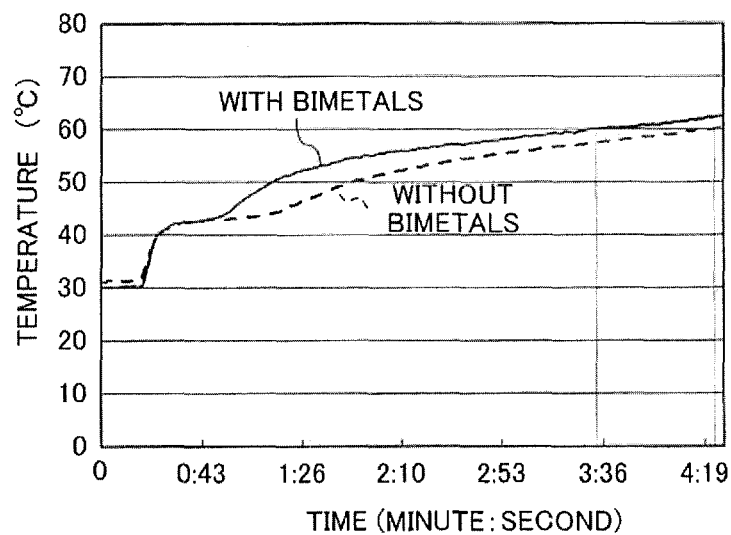
FIG. 4 is a view indicating a result obtained by causing hot water of 65° C. in temperature to flow through test heat exchangers, and checking lengths of time taken when the temperature of adsorbent sheets becomes 60° C.

Hot water at the temperature of 65° C. is caused to flow through the test heat exchangers 1, 2, and lengths of time taken when the temperature of the adsorbent sheets 24a becomes 60° C. are checked. FIG. 4 indicates the result.

As be understood from FIG. 4, it takes about 3 minutes and 30 seconds before the temperature of the adsorbent sheets 24a becomes 60° C. in the test heat exchanger 1 (with the bimetals), whereas it takes about 4 minutes and 20 seconds before the temperature of the adsorbent sheets 24a becomes 60° C. in the test heat exchanger 2 (without the bimetals). Accordingly, it is confirmed that the heat transfer rate is higher in the test heat exchanger 1 using the bimetals 37 than in the test heat exchanger 2 without using the bimetals 37.

Note that it is observed that when the hot water flows through the test heat exchanger 1, the bimetals 37 are deformed to expand the gap between the second heat transfer plate 35 and the pressing plate 36.

Second Embodiment

Figure 5:
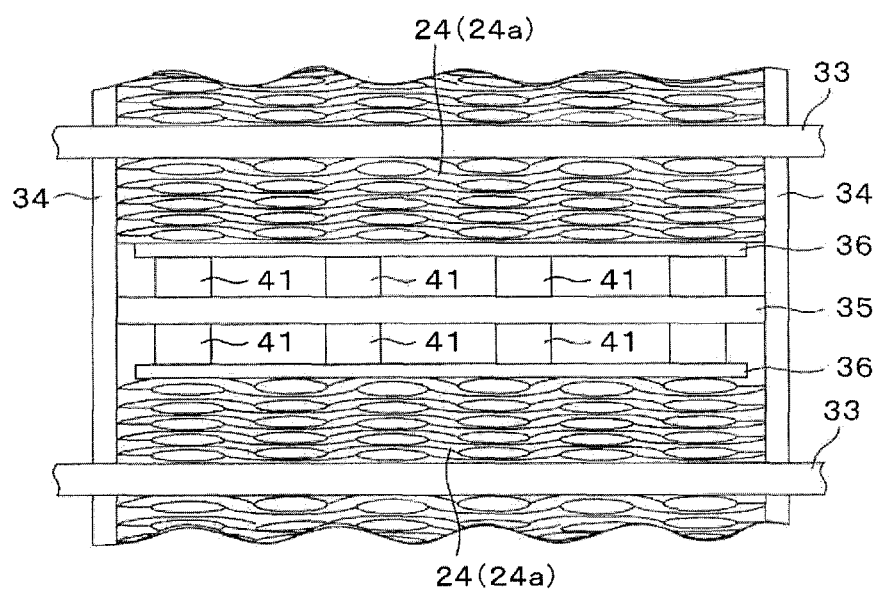
FIG. 5 is a plan view illustrating a structure inside an adsorbent heat exchanger in an adsorption heat pump according to a second embodiment.

FIG. 5 is a plan view illustrating a structure inside an adsorbent heat exchanger in an adsorption heat pump according to a second embodiment. Note that the difference between this embodiment and the first embodiment is in the use of a heat expansion member 41 instead of the bimetal 37, and the rest of the structure is basically the same as that of the first embodiment. Accordingly, in FIG. 5, the same components as in FIG. 2B are denoted by the same reference numerals and overlapping description thereof is omitted.

As illustrated in FIG. 5, in the adsorption heat pump according to this embodiment, heat expansion members 41 are placed between the second heat transfer plate 35 and the pressing plate 36. Each of the heat expansion members 41 is formed of a resin with a large heat expansion coefficient such as polyester, polyethylene or polyvinyl chloride. When the cooling water at the temperature of about 25° C. is supplied to the branched tube 33, almost no pressure is applied from each heat expansion member 41 to the pressing plate 36.

However, when the hot water at the temperature of about 70° C. is supplied to the branched tube 33, the heat expansion member 41 is thermally expanded and presses the pressing plate 36, and thus the adsorption member 24 is sandwiched and compressed between the pressing plate 36 and the branched tube 33. The same effect as that in the first embodiment may be achieved in this embodiment as well. In addition, this embodiment has an advantage in that no corrosion occurs because the heat expansion member 41 is formed of a resin.

Third Embodiment

Figure 6A:
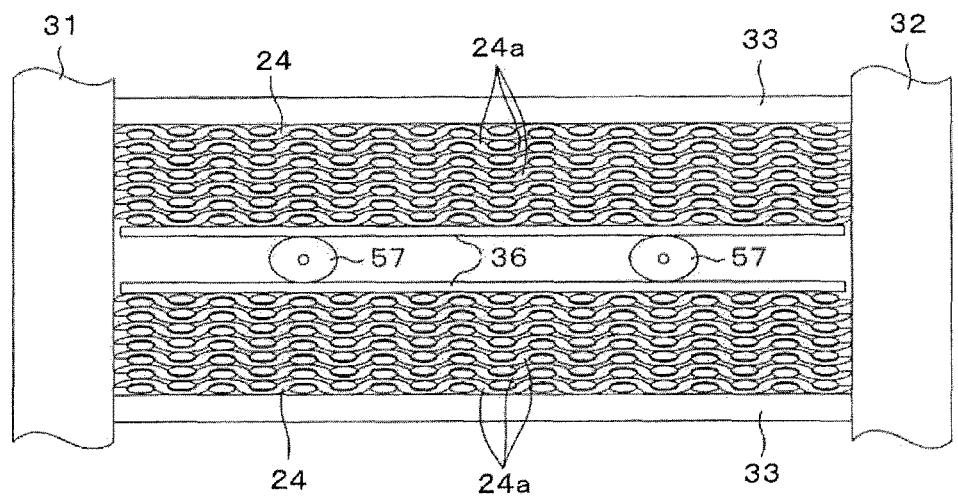
FIGS. 6A and 6B are plan views illustrating a structure inside an adsorbent heat exchanger in an adsorption heat pump according to a third embodiment.
Figure 6B:
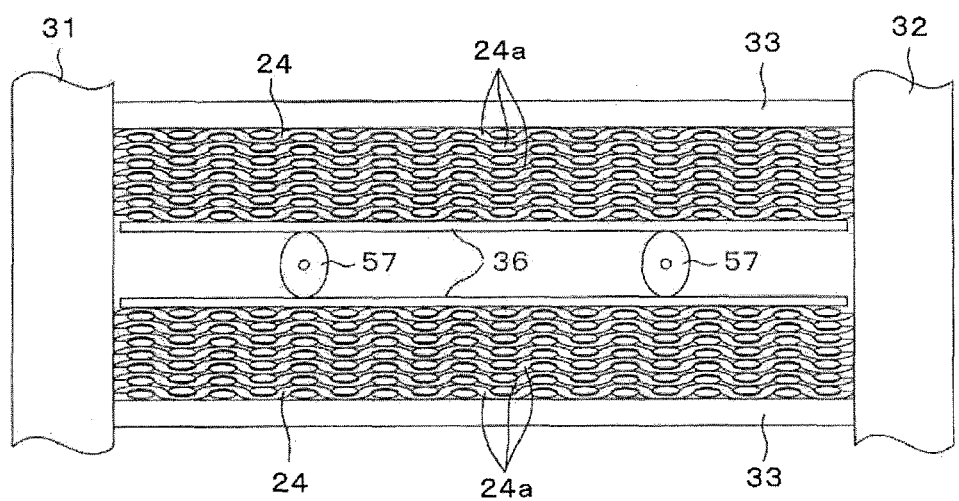
Figure 7:
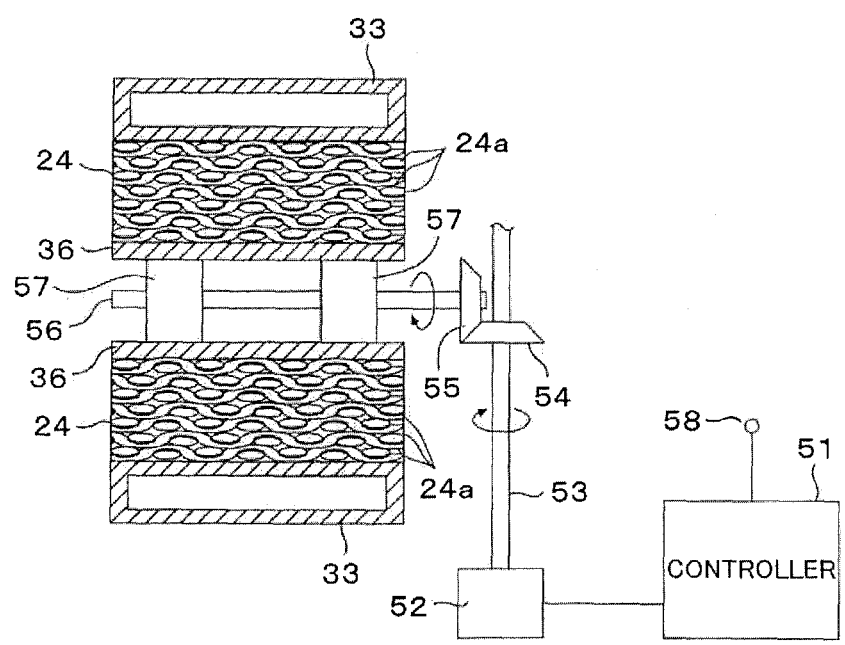
FIG. 7 is a schematic diagram illustrating a cam driving mechanism of the adsorption heat pump according to the third embodiment.

FIGS. 6A and 6B are plan views illustrating a structure inside an adsorbent heat exchanger in an adsorption heat pump according to a third embodiment. FIG. 7 is a schematic diagram illustrating a cam driving mechanism. Note that the difference between this embodiment and the first embodiment is in the provision of a cam 57 and a cam driving mechanism instead of the bimetals 37, and the rest of the structure is basically the same as that of the first embodiment. Accordingly, in FIGS. 6A and 6B, the same components as in FIG. 2B are denoted by the same reference numerals and overlapping description thereof is omitted.

As illustrated in FIGS. 6A and 6B, in this embodiment, two pairs of the adsorption members 24, two pressing plates 36, and elliptic cams 57 are placed between the branched tubes 33. A plurality of the adsorbent sheets 24a (activated carbon processed into sheet shapes) are superposed on one another to form the adsorption members 24 as in the first embodiment. In addition, each pressing plate 36 is placed on the opposite side to the corresponding branched tube 33 while interposing the adsorption member 24 in-between. Moreover, each cam 57 is placed between the two pressing plates 36.

As illustrated in FIG. 7, rotation of a rotary shaft 53 of a motor 52 is transmitted to a central shaft 56 for the cams 57 through gears 54, 55. The motor 52 is driven by a signal from a controller 51.

The controller 51 measures the temperature of the heat transfer tube 23 with a temperature sensor 58, determines whether the heating medium flowing inside the heat transfer tube 23 is the cooling water or the hot water by using the measurement result, and drives the motor 52 accordingly.

For example, when the temperature of the heat transfer tube 23 is 40° C. or below, the controller 51 determines that the heating medium flowing inside the heat transfer tube 23 is the cooling water. Then the controller 51 drives the motor 52 in such a way that a long axis of the cam 57 is placed in parallel with the branched tubes 33 as illustrated in FIG. 6A. In this way, the pressing force applied from the pressing plate 36 to the adsorption members 24 is reduced and the gap between the adsorbent sheets 24a becomes larger, whereby the refrigerant is easily adsorbed to the adsorbent sheets 24a.

In contrast, when the temperature of the heat transfer tube 23 exceeds 40° C., the controller 51 determines that the heating medium flowing inside the heat transfer tube 23 is the hot water. Then the controller 51 drives the motor 52 in such a way that the long axis of the cam 57 is placed perpendicular to the branched tubes 33 as illustrated in FIG. 6B. In this way, the pressing force applied from the pressing plate 36 to the adsorption member 24 is increased and the contact between the adsorbent sheets 24a becomes tight. Consequently, the heat transfer rate between the adsorbent sheets 24a is improved.

The same effect as that in the first embodiment may be achieved in this embodiment as well. In addition, this embodiment has an advantage in that the pressing plate 36 may be pressed by a larger pressing force than in the case of using the bimetals.

In this embodiment, the controller 51 drives the motor 52 and thereby changes the pressing force against the pressing plate 36. However, the pressing plate 36 may be pressed by using other methods. For example, the same effect may also be achieved by placing an expandable member configured to expand and contract by air between the pressing plates 36, and controlling a pressure of the air supplied to the expandable member by the controller 51.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adsorption heat pump comprising:
an evaporator configured to evaporate a refrigerant; and
an adsorbent heat exchanger including an adsorption member configured to adsorb vapor evaporated by the evaporator, and a heat transfer tube in which a heating medium flows,
wherein the adsorbent heat exchanger includes a pressing mechanism configured to press and compress the adsorption member depending on a temperature of the heating medium flowing inside the heat transfer tube, and
wherein the heat transfer tube includes:
an inlet manifold into which a heating medium flows;
an outlet manifold out of which the heating medium flows;

a plurality of branched tubes connected between the inlet manifold and the outlet manifold;

first heat transfer plates each placed perpendicular to the branched tubes and connecting the branched tubes; and a second heat transfer plate placed parallel to the branched tubes and connecting the first heat transfer plates, and the pressing mechanism includes:

a thermosensitive member fixed to the second heat transfer plate and designed to change in shape depending on a temperature of the heating medium flowing inside the branched tubes, the temperature being transferred to the thermosensitive member through the first heat transfer plates and the second heat transfer plate; and a pressing plate pressing the adsorption member, which is sandwiched between the pressing plate and a corresponding one of the branched tubes, toward the corresponding one of the branched tubes due to changing in shape of the thermosensitive member, when the temperature of the heating medium flowing inside the branched tubes is higher than a predetermined temperature, a pressing force against the pressing plate becomes larger due to changing in shape of the thermosensitive member, and the pressing plate moves toward the corresponding one of the branched tubes.

2. The adsorption heat pump according to claim 1, wherein the thermosensitive member is a member formed of any one of a bimetal, a shape memory alloy, and a shape memory resin.

3. The adsorption heat pump according to claim 1, wherein the adsorption member is formed of a plurality of adsorbent sheets superposed on one another.

4. The adsorption heat pump according to claim 3, wherein the adsorbent sheets include fibrous activated carbon processed into a sheet shape.

5. The adsorption heat pump according to claim 1, wherein the adsorption member includes at least one of silica gel, zeolite, and activated carbon.

6. The adsorption heat pump according to claim 1, wherein water or methanol is used as the refrigerant.

7. The adsorption heat pump according to claim 1, wherein when the temperature of the heating medium flowing inside the branched tubes is equal to or lower than the predetermined temperature, the pressing force against the pressing plate becomes smaller due to changing in shape of the thermosensitive member, and the pressing plate moves away from the corresponding one of the branched tubes.

* * * * *